United States Patent [19]

Eichlseder et al.

[11] Patent Number: 4,512,733
[45] Date of Patent: Apr. 23, 1985

[54] ADJUSTABLE INJECTION MOLDING BACKFLOW PREVENTER

[75] Inventors: Martin Eichlseder, Tettenweis; Erwin Bürkle, Benediktbeuern, both of Fed. Rep. of Germany

[73] Assignee: Krauss-Maffei Aktiengesellschaft, Munich, Fed. Rep. of Germany

[21] Appl. No.: 459,249

[22] Filed: Jan. 19, 1983

[30] Foreign Application Priority Data

Feb. 4, 1982 [DE] Fed. Rep. of Germany ....... 3203724

[51] Int. Cl.³ ............................................. B29F 3/02
[52] U.S. Cl. .................................... 425/207; 425/562; 425/563; 264/328.12
[58] Field of Search ............... 425/207, 562, 563, 564, 425/559, 560, 561; 366/77, 79; 264/328.1, 328.4, 328.12

[56] References Cited

U.S. PATENT DOCUMENTS

| Re. 30,335 | 7/1980 | Johansson | 425/564 |
| 3,438,393 | 4/1969 | Godley | 425/564 |
| 3,926,219 | 12/1975 | Ersfeld et al. | 425/564 |
| 4,349,044 | 9/1982 | Schirmer | 425/562 |
| 4,358,033 | 11/1982 | Dykehouse | 425/564 |
| 4,377,180 | 3/1983 | Biljes | 425/562 |

FOREIGN PATENT DOCUMENTS 1335824 10/1973 United Kingdom ................. 366/79

Primary Examiner—Jay H. Woo
Assistant Examiner—J. Fortenberry
Attorney, Agent, or Firm—Karl F. Ross; Herbert Dubno

[57] ABSTRACT

A backflow preventer on the end of a plastifying screw for an injection molding apparatus has a housing provided with radial bores which are axially and angularly offset. A pin accessible from the exterior of the housing passes through a radial hole but traversing in a valve member with clearance to permit the stroke of the valve member to be adjusted by selective insertion of the pin in the bores.

10 Claims, 3 Drawing Figures

4,512,733

ADJUSTABLE INJECTION MOLDING BACKFLOW PREVENTER

FIELD OF THE INVENTION

Our present invention relates to an adjustable backflow preventer between the worm or screw of an injection molding cylinder and the outlet thereof, and more particularly to a checkvalve for this purpose which has an adjustable response time.

BACKGROUND OF THE INVENTION

An injection molding installation is frequently provided with a worm or screw for plasticizing the synthetic resin material and for displacing it axially in a cylinder to force the plastified material into the mold through an outlet at the end of this cylinder (see, for example, German open application No. 28 36 165, or German utility model GM No. 76 39 875).

It is known, for example, from the above identified German application, to provide the worm or screw with a backflow preventer or checkvalve which is designed to prevent, as the injection pressure builds up ahead of the screw, the flowable synthetic resin from reversing its direction and returning into the plastifying compartment.

It has been found to be advantageous to make this valve adjustable with respect to the response time to compensate for the differences in the viscosity or other rheological properties of the synthetic resin material. It is also important that the checkvalve open only at a certain pressure to insure effective plastification and homogenization of the molten synthetic resin material.

While adjustable checkvalves have been provided in the past, they have been comparatively expensive, complicated to adjust and unreliable. The most important disadvantage, however, was the difficulty which was encountered when resetting of the checkvalve for materials with other rheological properties than those previously used was necessary.

OBJECTS OF THE INVENTION

It is, therefore, the principal object of the present invention to provide an improved injection molding unit whereby the disadvantages described previously are obviated.

Still another object is to provide a comparatively low cost reliable backflow preventer for an injection molding screw whose stroke can be readily and simply changed.

It is also an object of this invention to provide a checkvalve for the purposes described, which includes a member axially shiftable by the pressure of the molten plastic forced past this checkvalve and with an easily reset axial stroke.

SUMMARY OF THE INVENTION

These objects and others which will become apparent hereinafter are attained, in accordance with the present invention, in an injection molding assembly which comprises a plastification cylinder, a worm or screw rotatable in this cylinder and having an end turned toward the discharge side of this cylinder, and a backflow preventer on this end of the screw comprising a valve housing and an axially displaceable valve member received in this housing.

The housing, according to the invention, has a threaded stem affixed in a female thread in the screw and defines a guide for the valve member which can project into the cylinder beyond the valve housing and forms a metering body having a diameter less than the diameter of the cylinder.

A stroke-limiting pin couples the valve member or metering body with the housing and, according to the invention, the pin beyond the end of the screw is received in one of the two members, i.e. the housing or the valve member, in a circular bore whose diameter corresponds to that of the pin, but is shiftable in an elongated opening or slot in the other member, this slot being elongated in the direction of axial displacement of the valve member or metering body.

When at least two such bores in angularly offset relationship are formed in the first member and/or at least two such slots in angularly offset relationship are formed in the other member and the bores and slots are offset in the direction of displacement of the valve member, simple radial withdrawal of the bolt and angular displacement of the valve member relative to the housing member will permit, upon reinsertion of the bolt, resetting of the checkvalve for a different axial stroke.

An important feature of the invention is that the slot or bore in the housing member, opens at the outer periphery thereof so that an advance of the screw just sufficiently to bring the housing member out of the cylinder bore will permit the pin to be removed radially and the checkvalve reset. Disassembly of the checkvalve is therefore not necessary, and the disadvantages of checkvalves which must be reset by undoing or adjusting screw connections are avoided.

According to the invention, four possible axial strokes of the checkvalves can be obtained when the housing is provided with two radial bores angularly offset by 90° and having their axes mutually offset in the direction of displacement of the valve member, while the valve member is provided with two slots or elongated openings, also angularly offset by 90° and mutually offset in the direction of displacement of the valve member. If the two bores are designated as "A", "B" and the two slots as "C" and "D", by passing a pin through combinations "A" "C", "A" "D", "B" "C", AND "B" "D", it is possible to obtain four different axial strokes simply by angularly offsetting the valve member and the housing member about the axis of the checkvalve. Of course, additional bores and slots can be provided to increase the number of different strokes to which the checkvalve can be set.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
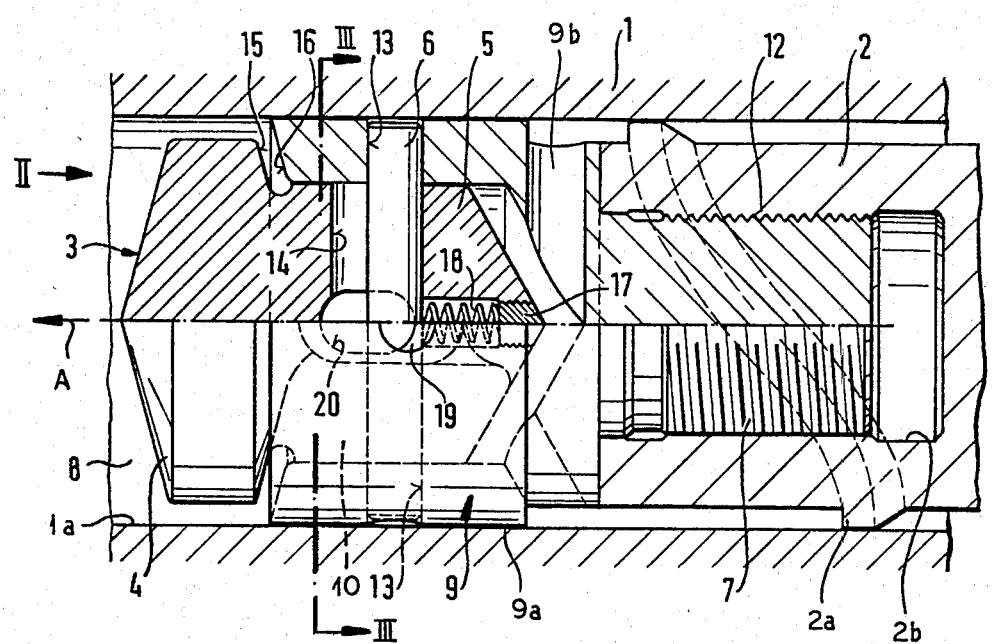
FIG. 1 is a partial axial cross section of the plastifying screw and the backflow preventer according to the invention.

In the drawing, we have shown a metering body formed with a conical or frustoconical forward face and received with all around clearance in a bore 1a of a plastifying cylinder 1.

Figure 3:
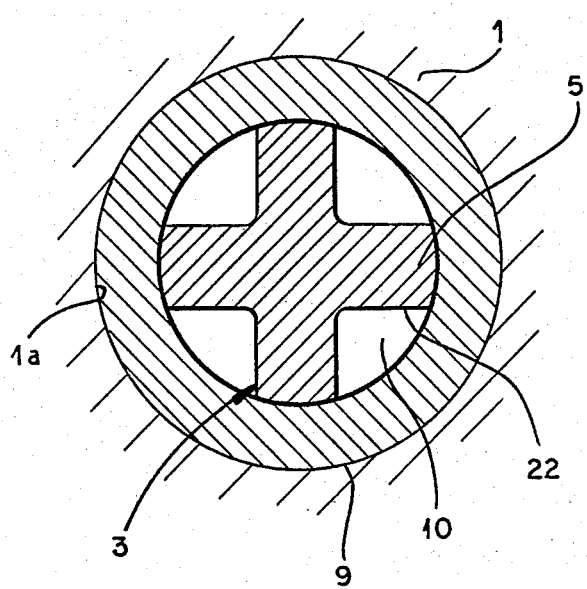
FIG. 3 is a cross sectional view taken along the line III—III of FIG. 1.

The metering body 3 also constitutes an axially shiftable valve member which has a shank 5 of cruciform cross section (see FIG. 3) received within a valve housing 9 mounted at the leading end of a plastifying worm or screw 2. The latter has the usual thread 2a for plastifying, homogenizing and displacing the plastic material so that it is fed toward the backflow and preventer valve 3, 9 in the usual manner. Details of the drive of the screw, the manner in which the plastic material is fed to the latter, and the way in which the screw is axially displaced to inject the molten synthetic resin material into a mold can be found in the open German application mentioned previously.

The outlet of the cylinder bore 1a is, of course, to the left and the housing 9 is connected by a threaded stem 7 to a female thread in an axially open bore 2b of the worm 2.

Figure 2:
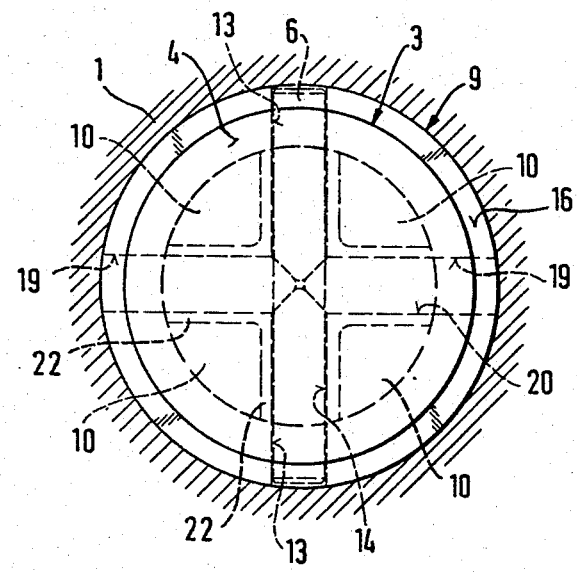
FIG. 2 is a view in the direction of area II of FIG. 1.

The housing 9 is formed with two pairs of radial bores 13 and 19 which are angularly offset from one another by 90° (See FIG. 2). The radial axis of the bores 13 is offset somewhat forwardly of the axis of the bores 19 in the direction of displacement of the following member 3 represented by the arrow A. The bores 13 and 19 are of circular cross section and open at the outer periphery 9a of the housing 9.

A pin 6 of circular cross section is shown to be inserted radially in the bores 13.

When the entire assembly is moved to the left beyond the end of the bore 1a, the pin 6 can be readily removed radially without otherwise disassembling the unit and can be reinserted in, say, the bores 19.

The pin also extends selectively through a slot 14 which is elongated in the direction A. Alternatively, depending upon the angular orientation of the body 3 with respect to the housing, the pin can traverse a similar slot 20. The slots 14 and 20 are also mutually offset in the direction of arrow A, as is clearly visible from FIG. 1.

The pin 6 thus limits the axial displaceability of the valve member 3 to the left to a degree determined by which of the bores and which of the slots is traversed by this pin.

To the right the mobility of the valve member is limited by contact between abutment surfaces 15 and 16, which close the valve when they are in contact. The body 3 is urged into this closed position by a compression spring 18 which bears upon the pin and upon a spring seat formed by a screw 17 threaded axially into the shank 5 (FIG. 1).

The valve is shown in its open position in FIG. 1 and the molten synthetic resin material from the worm 2 can pass through radial passages 9b in the housing to flow through four axial passages 10 which can have a substantial cross section in total, to thereupon flow through the annular space between the surfaces 15 and 16 while the plastic material under pressure holds the valve open against the force of the spring 18.

Since the slots 14 and 20 are formed in the ribs 22 defining the cruciform shank, the axial stroke can be eliminated to varying degrees depending upon which of the slots and which of the pairs of bores are engaged by the pin 6. For example, a different axial stroke will be provided with the pin in the orientation shown if the pin is extracted as described, the body 3 is rotated through 90° and the pin reinserted in its original orientation. Still another stroke is obtained by moving the pin to the bores 19 and, finally by angularly offsetting the housing and the body 3 with the pin in this position. Consequently, four different axial strokes can be provided.

We claim:

1. In an injection molding plastifying assembly in combination:
    means defining a plastifying cylinder;
    a plastifying worm received in a bore of said cylinder and having an end past which molten synthetic resin is displaced; and
    a backflow preventer mounted on said end of said worm, said backflow preventer comprising:
    a housing member affixed to said worm, said housing member being formed with at least one passage adapted to be traversed by the molten synthetic resin,
    a valve member having a generally conical forward face received with direct all around clearance in said bore forwardly of said housing member and having a shank of a smaller diameter than said face slidably inserted into said housing member such that said valve member is axially shiftable slidably relative to said housing member between an open position permitting said molten synthetic resin to flow past said valve member and a closed position blocking the flow of molten synthetic resin past said valve member, axial displacement between said positions defining a stroke of said valve member, one of said members being provided with two circular cross section radial bores and the other of said members being provided with an opening elongated in the direction of said stroke, and
    a pin accessible from the periphery of said housing member and selectively passing through one of said bores and said opening for limiting said stroke at least in one direction, said one of said members being provided with said radial bores in angularly offset relation to one another and such that one of said radial bores is offset from the other of said radial bores in said direction, said pin being selectively insertable into said radial bores for setting the stroke of said backflow preventer.

2. The combination defined in claim 1, further comprising a spring received in said valve member and bearing axially on said pin for urging said valve member into a closed position.

3. The combination defined in claim 1 wherein the other of said members is provided with two such openings angularly offset from one another with one of said openings being offset from the other of said openings in said direction whereby relative angular adjustment of said members permits said pin to selectively engage in said openings and selecting a predetermined stroke of said valve member.

4. The combination defined in claim 3, further comprising a spring received in said valve member and bearing axially on said pin for urging said valve member into a closed position.

5. The combination defined in claim 3 wherein the other of said members is provided with two such openings angularly offset from one another with one of said openings being offset from the other of said openings in said direction whereby relative angular adjustment of said members permits said pin to selectively engage in said openings and selecting a predetermined stroke of said valve member.

6. The combination defined in claim 5, further comprising a spring received in said valve member and bearing axially on said pin for urging said valve member into a closed position.

7. The combination defined in claim 5 wherein said one of said members is said housing member and said other of said members is said valve member.

8. The combination defined in claim 7, further comprising a spring received in said valve member and bearing axially on said pin for urging said valve member into a closed position.

9. The combination defined in claim 3 wherein said one of said members is said housing member and said other of said members is said valve membser.

10. The combination defined in claim 9, further comprising a spring received in said valve member and bearing axially on said pin for urging said valve member into a closed position.

* * * * *